US012447473B2

(12) United States Patent
Najafi (10) Patent No.: US 12,447,473 B2
(45) Date of Patent: Oct. 21, 2025

(54) APPARATUS FOR STORING PLATELET-RICH PLASMA (71) Applicant: PPlus Skin Care Limited, Southampton (GB)

(72) Inventor: Mitra Najafi, Southampton (GB)

( * ) Notice: Subject to any disclaimer, the term of this patent is extended or adjusted under 35 U.S.C. 154(b) by 773 days.

(21) Appl. No.: 17/433,964

(22) PCT Filed: Mar. 6, 2020

(86) PCT No.: PCT/GB2020/050529
§ 371 (c)(1),
(2) Date: Aug. 25, 2021

(87) PCT Pub. No.: WO2020/178593
PCT Pub. Date: Sep. 10, 2020

(65) Prior Publication Data
US 2022/0111392 A1 Apr. 14, 2022

(30) Foreign Application Priority Data
Mar. 6, 2019 (GB) ..................................... 1902993

(51) Int. Cl.
*B01L 9/06* (2006.01)
*B01F 29/15* (2022.01)
(Continued)

(52) U.S. Cl.
CPC ............... *B01L 9/06* (2013.01); *B01F 29/15* (2022.01); *B01F 29/321* (2022.01);
(Continued)

(58) Field of Classification Search
CPC ...... B01F 29/15; B01F 29/321; B01F 29/322; B01L 9/06; A61M 1/0254
See application file for complete search history.

(56) References Cited

U.S. PATENT DOCUMENTS 4,056,260 A 11/1977 David
2006/0093514 A1 5/2006 Dawes
(Continued)

FOREIGN PATENT DOCUMENTS

CN 204583254 U 8/2015
CN 108187780 A * 6/2018
(Continued)

OTHER PUBLICATIONS

Espacenet translation of Linyan Liang (CN108187780), published Feb. 6-22, 2018 (Year: 2018).*
(Continued)

*Primary Examiner* — Elizabeth Insler
(74) *Attorney, Agent, or Firm* — Lynch LLP; Sean Lynch (57) ABSTRACT The disclosure provides an apparatus for storing platelet-rich plasma (PRP). The apparatus is configured to reversibly receive a platelet-rich plasma (PRP) container. The apparatus comprises a platform defining at least one recess configured to receive the PRP container therein; and an agitator configured to move the platform, and thereby agitate PRP stored in the PRP container. The agitator is configured to move the platform in a circular motion at a frequency of between 10 and 10,000 revolutions per minute (RPM).

13 Claims, 9 Drawing Sheets (51) Int. Cl.
*B01F 29/321* (2022.01)
*B01F 29/322* (2022.01)
*B01F 29/34* (2022.01)
*B01F 35/32* (2022.01)
*B01F 35/90* (2022.01)
*B01F 101/23* (2022.01)

(52) U.S. Cl.
CPC ............ B01F 29/322 (2022.01); B01F 29/34 (2022.01); B01F 35/32025 (2022.01); B01F 35/90 (2022.01); *B01F 2035/98* (2022.01); *B01F 2101/23* (2022.01); *B01F 2215/0422* (2013.01); *B01F 2215/0472* (2013.01); *B01F 2215/0481* (2013.01); *B01L 2200/0647* (2013.01); *B01L 2300/042* (2013.01); *B01L 2300/0609* (2013.01); *B01L 2300/0663* (2013.01); *B01L 2300/1805* (2013.01); *B01L 2300/1894* (2013.01)

(56) References Cited

U.S. PATENT DOCUMENTS

| 2014/0293735 | A1 | 10/2014 | Vidakovic et al. | |
|---|---|---|---|---|
| 2016/0015209 | A1* | 1/2016 | Dunn | A47J 36/2438 99/483 |
| 2018/0127703 | A1* | 5/2018 | Jarvius | A01N 1/144 |
| 2019/0364884 | A1* | 12/2019 | Rushing | A61M 1/0277 |

FOREIGN PATENT DOCUMENTS

| KR | 20120018851 A | 3/2012 |
|---|---|---|
| KR | 20150080901 A | 7/2015 |
| WO | 2014002954 A1 | 1/2014 |
| WO | 2018010999 A1 | 1/2018 |

OTHER PUBLICATIONS

Moore, Gary W., et al., Platelet-rich plasma for tissue regeneration can be stored at room temperature for at least five days, British Journal of Biomedical Science, 2017, vol. 74, No. 2, 71-77, http://dx.doi.org/10.1080/09674845.2016.1233792.

Bertino, A.M., et al., Apoptotic markers are increased in platelets stored at 37C, Programmed Cell Deaths in PLT's, Transfusion, vol. 43, Jul. 2003, pp. 857-866.

* cited by examiner

APPARATUS FOR STORING PLATELET-RICH PLASMA

The present invention relates to an apparatus configured to store a container of platelet-rich plasma (PRP). The invention extends to a kit comprising the apparatus and container and the container per se. The invention also relates to a method of storing PRP.

Platelets are circulating, anucleate cytoplasmic fragments of their parent cells, the megakaryocytes, which are confined to the haemopoietic compartments of bone. Each megakaryocyte produces between 2000-3000 platelets. Whilst platelets tend to be considered as having their primary role in haemostasis, they are intricately involved in the initiation of wound healing. Despite being mere cell fragments, platelets have complex, specialised structure and physiology.

As a concentrated source of platelets, plasma contains several cytokines that stimulate tissue regeneration and have anti-ageing activity. Plasma may be obtained by centrifuging blood until it is separated in its main compounds: red blood cells, white blood cells and plasma. The richer part of plasma is called platelet-rich plasma (PRP) or fraction 2 (F2) and the poorer part of plasma is called platelet-poor plasma (PPP) or fraction 1 (F1).

The prominent role played by platelets in wound healing and the relatively easy generation and application of PRP in the clinic or surgical setting has led to an increase in the use of PRP to promote soft and hard tissue regeneration. In particular, autologous PRP has been used in the treatment of chronic skin and soft tissue ulcerations, maxillofacial surgery, orthopaedic and trauma surgery, plastic surgery, spinal surgery, heart bypass surgery and burns. It has also been used in a variety of settings in dentistry, such as oral mucosa healing, root canal revascularisation and scaffolding for regenerative endodontics.

Local delivery of a single growth factor, commonly recombinant platelet-derived growth factor BB (PDGF-BB), has also been employed. However, use of PRP represents a greater similarity to the natural healing process and permits application of multiple wound healing promoters in their biologically determined ratios. Additionally, the short shelf life of recombinant PDGF-BB, cost and concerns about side effects make PRP a more attractive and cost-effective proposition.

However, once obtained, PRP has a relatively short shelf-life. In part this is due to platelets being anucleate, so that even in vivo they only have a lifespan of 8-10 days. However, in vitro samples tend to have a shorter shelf-life due to aggregation of the platelets. Accordingly, there is a need for improved apparatus and methods for storing PRP.

The present invention arises from the inventor's work in attempting to overcome the problems associated with the prior art.

In accordance with a first aspect of the invention, there is provided an apparatus for storing platelet-rich plasma (PRP), the apparatus being configured to reversibly receive a platelet-rich plasma (PRP) container and comprising:
- a platform defining at least one recess configured to receive the PRP container therein; and
- an agitator configured to move the platform, and thereby agitate PRP stored in the PRP container, wherein the agitator is configured to move the platform in a circular motion at a frequency of between 10 and 10,000 revolutions per minute (RPM).

Advantageously, the inventors have found that the agitator reduces activation and debris formation within the PRP.

Preferably, the platform defines a plurality of recesses, wherein each recess is configured to receive a PRP container therein. Accordingly, the apparatus may be configured to reversibly receive a plurality of PRP containers.

The platform may define at least 2, at least 4, at least 6, at least 8, at least 10, at least 12 or at least 8 recesses, wherein each recess is configured to receive a PRP container therein. The platform may define between 1 and 100 recesses, between 2 and 50 recesses, between 3 and 25 recesses or between 5 and 15 recesses, wherein each recess is configured to receive a PRP container therein. The inventors have found that using the apparatus of the first aspect it is possible to store PRP for up to eight days. Accordingly, in one embodiment, the apparatus platform defines 8 recesses, wherein each recess is configured to receive a PRP container therein. Accordingly, each container can contain PRP to be used by a person on a separate day. Alternatively, the apparatus could comprise 14 recesses, wherein each recess is configured to receive a PRP container therein. Accordingly, this would provide a week's supply of PRP to a user in portions to be used twice a day.

The apparatus may comprise a retainer configured to retain the PRP container in the recess. Advantageously, the retainer prevents the PRP container from becoming dislodged and thereby prevents spillage or leaks. The retainer may comprise a biasing means configured to bias the PRP container against a first side of the recess. Advantageously, the biasing means holds the container in the recess. The first side of the recess may define an angle between 0 and 900 to the vertical, more preferably, between 5 and 45° to the vertical, between 10° and 35° to the vertical or between 15° and 30° to the vertical, and most preferably between 18 and 25° to the vertical, between 19 and 22.5° to the vertical or between 20 and 21° to the vertical.

The biasing means may comprise a spring, wherein a proximal end of the spring is fixedly attached to a second side of the recess and the spring is configured to bias the PRP container against the first side of the recess, wherein the second side is opposite to the first side. Preferably, the spring defines an angle between 0 and 20° to the horizontal, more preferably between 0 and 10° to the horizontal, and most preferably between 0 and 5° to the horizontal or between 0 and 2.5° to the horizontal. Advantageously, as a user inserts a container into the recess at the angle defined by the second side thereof, a base of the container will push the spring towards the second side of the recess allowing the base to pass the spring.

The biasing means may further comprise a contacting member disposed on the distal end of the spring. The contacting member may define a surface which matches the profile of the PRP container. Accordingly, the contacting member may define a flat or concave surface. Advantageously, the contacting member increases the contact area with the PRP container. The surface may define an angle between 0 and 90° to the vertical, more preferably, between 5 and 45° to the vertical, between 10° and 35° to the vertical or between 15° and 30° to the vertical, and most preferably between 18 and 25° to the vertical, between 19 and 22.5° to the vertical or between 20 and 21° to the vertical.

It may be appreciated that the angles recited above may be defined when the apparatus is disposed on a flat and level surface.

In embodiments where the platform comprises multiple recesses, the apparatus may comprise a retainer for each recess. Each retainer may be as defined above.

The agitator may comprise a speed controller. When the agitator is activated, the speed controller may be configured to gradually increase the frequency of agitation until it reaches a target frequency. The speed controller may be configured to increase the frequency of agitation between 0.001 and 100 seconds, between 0.01 and 10 seconds or between 0.1 and 1 second. Advantageously, this could reduce stresses within the device.

The agitator may be configured to move the platform in a circular motion at a frequency of between 50 and 1,000 RPM, more preferably between 100 and 750 RPM or between 150 and 500 RPM and most between 200 and 400 RPM or between 250 and 450 RPM.

The inventors have found an agitation speed of about 300 RPM is particularly advantageous for the storage of PRP.

The agitator may comprise a motor, comprising a rotor and a stator. The agitator may comprise a cam disposed on the rotor. The platform may be coupled to the cam.

Accordingly, the motor would cause the platform to move in a circular motion. The apparatus may be configured to prevent the platform from rotating. The apparatus may comprise bearings disposed between the cam and the platform. Advantageously, the bearings reduce friction between the cam and the platform.

The agitator may be further configured to agitate PRP stored in the PRP container by being configured to move the PRP container in a linear motion.

The apparatus may be configured to agitate the PRP stored in the PRP container continually. Alternatively, the apparatus may be configured to agitate the PRP stored in the PRP container intermittently. Accordingly, the apparatus may be configured to switch between a first configuration, in which the activator is activated, and a second configuration, in which the agitator is not activated. The apparatus may be configured to agitate the PRP stored in the PRP container for at least 10% of the storage time, more preferably at least 20% of the storage time, at least 30% of the storage time or at least 40% of the storage time, and most preferably at least 50% of the storage time. The apparatus may be configured to agitate the PRP stored in the PRP container for less than 90% of the storage time, more preferably less than 80% or less than 70% of the storage time, and most preferably less than 60% of the storage time. The apparatus may be configured to agitate the PRP stored in the PRP container for between 10 and 90% of the storage time, more preferably between 20 and 80% or between 30 and 70% or the storage time and most preferably between 40 and 60% of the storage time. The storage time may be defined as the time that the PRP is stored in the PRP container and the container is disposed on the platform. Advantageously, the inventors have found that intermittent agitation is able to reduce activation and debris formation within the PRP while reducing power consumption.

Preferably, time periods between agitation are less than 24 hours, more preferably less than 20 hours, less than 15 hours or less than 10 hours, and most preferably is less than 5 hours, less than 2 hours, less than 1.5 hours, less than 1.25 hours or less than 1 hours. Preferably, the time periods between agitation are at least 5 minutes, more preferably at least 10 minutes, at least 15 minutes or at least 20 minutes, and most preferably at least 30 minutes, at least 40 minutes, at least 50 minutes or at least 60 minutes. Preferably, time periods between agitation are between 5 minutes and 24 hours, more preferably between 10 minutes and 20 hours, between 15 minutes and 15 hours or between 20 minutes and 10 hours, and most preferably between 30 minutes and 5 hours, between 40 and 120 minutes, between 50 and 90 minutes or between 60 and 75 minutes. The time periods between agitation may be considered to be the length of time that the apparatus is in the second configuration continuously.

Accordingly, the apparatus may be configured to perform a predetermined agitation pattern. The predetermined agitation pattern may be understood to be defined by the length of time the agitator is configured to be in the first configuration and the length of time the agitator is configured to be in the second configuration. The agitator is preferably configured to repeat the predetermined agitation pattern.

It may be appreciated that in an embodiment where the apparatus is configured to agitate the PRP stored in the PRP container for between 40 and 60% of the storage time and time periods between agitation are less than less than 4 hours, the device could be configured to switch between the first and second configurations every two hours, i.e. it could be configured to agitate the PRP containers for two hours and then not agitate them for a further two hours.

The apparatus may comprise a housing. The agitator may be disposed inside the housing. The platform may be disposed substantially adjacent to the housing. The housing may comprise a top edge. Preferably, the top edge defines a projection which extends substantially around the circumference thereof. Preferably, the platform is disposed substantially adjacent to the top edge. The platform may comprise a flange which extends substantially around an outer circumference of the platform. Preferably, the flange is disposed substantially adjacent to the projection. Preferably, the flange is disposed substantially around the projection. Advantageously, the projection and flange reduce the ingression of dust into the housing.

The apparatus may comprise dampening means disposed within the housing. The dampening means may be configured to absorb vibrations, preferably noise vibrations.

The dampening means may comprise a natural or synthetic rubber or a padding material. The synthetic rubber may comprise neoprene. The padding may comprise cotton wool. The dampening means may be disposed between the agitator and the platform. Advantageously, the dampening means are configured to reduce noise produced by the apparatus.

The apparatus may comprise a cover configured to fit over the platform and any PRP containers disposed thereon. The housing may be shaped to reversibly receive a portion of the cover. Preferably, the cover is airtight. Advantageously, the cover prevents dirt and other environmental contaminants which may be present in the air from contacting the PRP containers. The cover may comprise an integrated handle.

Advantageously, a user could pick up the agitation device by the handle and transport it.

The apparatus may be configured to prevent inadvertent removal of the cover from over the platform. The cover may comprise screw threads. The platform or housing may comprise corresponding screw threads. Advantageously, the cover may be screwed into place, preventing inadvertent removal. Alternatively or additionally, the apparatus may comprise a child safety lock configured to prevent removal of the cover from the platform and/or housing. The cover may comprise a tab, such that the cover is removed when it is twisted, relative to the platform and/or housing, and a force is applied to the tab.

Alternatively, the apparatus may comprise an agitating portion and a containing portion, wherein the agitating portion comprises the agitator, and the containing portion, is configured to reversibly receive the agitating portion. In embodiments where is it present, the agitating portion may comprise the housing. The containing portion may comprise a base, configured to reversibly receive the agitating portion, and a lid, configured to reversibly fit over the base when the agitating portion is disposed therein. Advantageously, the containing portion prevents dirt and other environmental contaminants which may be present in the air from contacting the agitating portion and the PRP containers. Preferably, the case is airtight. The containing portion may comprise a handle. Advantageously, the handle enables a user to more readily carry and transport the apparatus.

The housing, platform, cover and/or containing portion may comprise a plastic. The housing, platform, cover and/or containing portion may be injection moulded. The plastic may comprise a thermoplastic polymer. The plastic may comprise acrylonitrile butadiene styrene (ABS), polyethylene, polycarbonate, polyamide, polystyrene or polypropylene. The polystyrene may be high impact polystyrene.

The agitator may comprise aluminium, brass and/or steel.

The apparatus may comprise a temperature controller configured to maintain PRP stored in the PRP container at a temperature of at least 15° C., more preferably at least 16° C., at least 17° C. or at least 18° C., and most preferably at least 19° C. or at least 20° C.

Preferably, the temperature controller is configured to maintain PRP stored in the PRP container at a temperature of less than 30° C., more preferably less than 29° C., less than 28° C., less than 27° C. or less than 26° C., and most preferably less than 25° C. or less than 24° C. The temperature controller may be configured to maintain PRP stored in the PRP container at a temperature between 15° C. and 30° C., more preferably between 16° C. and 28° C., between 17° C. and 27° C. or between 18° C. and 26° C., and most preferably between 19° C. and 25° C. or between 20° C. and 24° C.

The temperature controller may be configured to control the temperature of the area between the platform and the cover, thereby maintaining PRP stored in the PRP container at a desired temperature as defined herein. Alternatively, or additionally, the temperature controller may be configured to control the temperature within the containing portion.

The temperature controller may comprise a temperature sensor configured to sense a temperature. The temperature sensor may be configured to sense the temperature within a recess. Accordingly, the temperature sensor may be disclosed in a recess.

Alternatively or additionally, the temperature sensor may be configured to sense the temperature between the platform and the cover.

The temperature controller may comprise a proportional-integral-derivative (PID) controller.

The apparatus may comprise a clock. The clock may comprise a microchip configured to keep time. The clock may be disposed in the housing.

In some embodiments, the temperature controller may comprise a heater. The heater may be configured to activate when a temperature below a predetermined minimum temperature is sensed. The heater may be configured to heat a recess and/or the area between the platform and the cover when it is active. The predetermined minimum temperature may be a temperature of at least 15° C. More preferably the predetermined minimum temperature is a temperature of between 16° C. and 24° C., a temperature or between 17° C. and 23° C. or a temperature of between 18° C. and 22° C., and most preferably the predetermined minimum temperature is between 19° C. and 21° C. The heater may be configured to deactivate when the predetermined minimum temperature is reached.

However, the inventors have found that the agitator generates heat. Accordingly, in some embodiments, a separate heater is not required. In embodiments where the apparatus is configured to agitate the PRP stored in the PRP container intermittently, the apparatus may be configured to switch the apparatus to the first configuration if a temperature below a predetermined minimum temperature is sensed. Accordingly, the agitator may be configured to override the predetermined agitation pattern, and activate the agitator, if a temperature below a predetermined minimum temperature is sensed. The predetermined minimum temperature may be as defined above. The apparatus may be configured to revert to the predetermined agitation pattern when the predetermined minimum temperature is reached.

The temperature controller may comprise a cooler. The cooler may be configured to activate when a temperature above a predetermined maximum temperature is sensed. The cooler may comprise a fan. The fan may be disposed in the containing portion, and preferably in the base of the containing portion. Accordingly, the cooler may be configured to circulate air within the containing portion. The cooler may be configured to cool a recess and/or the area between the platform and the cover when it is active. The predetermined maximum temperature may be a temperature of between 20° C. and 30° C., a temperature or between 21° C. and 28° C. or a temperature of between 22° C. and 26° C., and most preferably the predetermined minimum temperature is between 23° C. and 25° C. The cooler may be configured to deactivate when the predetermined maximum temperature is reached.

Accordingly, the apparatus may be configured to maintain PRP stored in the PRP container at a temperature of between 15° C. and 29° C., more preferably at a temperature between 16° C. and 28° C., between 17° C. and 27° C. or between 18° C. and 26° C., and most preferably between 19° C. and 25° C. or between 20° C. and 24° C.

The apparatus may be configured to be connected to a mains power source.

Advantageously, the mains power source could power the agitator and/or the temperature controller. Preferably, the mains power source could power the agitator and the temperature controller.

Alternatively, or additionally, the apparatus comprises a battery configured to power the agitator and/or the temperature controller. Preferably, the battery is configured to power the agitator and the temperature controller.

In a preferred embodiment, the apparatus is configured to be connected to a mains power source and comprises a battery. Preferably, the battery is a rechargeable battery and the mains power source can recharge the battery. Advantageously, the apparatus can be powered by mains electricity for long periods of time without the need for battery to be replaced or recharged. However, the battery can be used if there is a power outage or if the apparatus is moved away from a mains power source. This ensures that the agitator and temperature controller may work continuously without interruption.

The apparatus may comprise a display configured to convey information to a user. The display may be configured to inform a user if the apparatus is (a) using a main power supply; (b) using a battery power supply; (c) agitating at a target frequency; and/or (d) the PRP is being held at a target temperature. The display may comprise one or more LED lights.

The apparatus may comprise a transmitting module. The transmitting module may be configured to transmit a notification to a receiver. The transmitting module may be a wireless transmitting module and may be configured to transmit the notification wirelessly to the receiver. The transmitting module may be configured to transmit the notification using Bluetooth® technology, via a radio frequency (RF) signal, via a wireless internet network and/or using near-field communication (NFC) technology. The receiver may be a mobile communications device.

The transmitting module be configured to transmit a notification to the receiver when (a) power supply from the mains power source is interrupted; (b) the battery falls below a predetermined charge; (c) the temperature sensor detects a temperature above a predetermined maximum temperature; and/or (d) the temperature sensor detects a temperature below a predetermined minimum temperature. The predetermined maximum and minimum temperatures may be as defined above. The predetermined charge may be 50% of full charge or less, 40% of full charge or less, 30% of full charge or less, 20% of full charge or less or 10% of full charge or less. The receiver may be configured to display a message when it receives the notification from the transmitting module. Advantageously, the user would be informed if the apparatus was at risk of losing power and/or if it was too hot or too cold, and could take appropriate action.

Alternatively, or additionally, the transmitting module may be configured to constantly transmit a notification to the receiver while the apparatus is supplied with electrical power. The receiver may be configured to display a message if the notification is interrupted. Advantageously, the user would be informed if the apparatus lost power, and could take appropriate action.

Alternatively, or additionally, the apparatus may comprise an alarm configured to go off when (a) power supply from the mains power source is interrupted; (b) the battery falls below a predetermined charge; (c) the temperature sensor detects a temperature above a predetermined maximum temperature; and/or (d) the temperature sensor detects a temperature below a predetermined minimum temperature.

The apparatus may comprise a memory. The memory may comprise a memory card disposed inside housing. Alternatively, the apparatus may comprise a connector configured to connect the apparatus to an external memory. The connector may comprise a USB port. Alternatively, the connector may be the transmitting module. The external memory may comprise a USB memory stick, a server or a mobile communications device. The apparatus may be configured to store data to the memory. The data could comprise a temperature sensed by the temperature sensor. The data could further comprise the time at which the temperature was sensed. The apparatus could be configured to store temperature sensed by the temperature sensor at specific time intervals. The specific time interval may be less than 48 hours, more preferably less than 24 hours, less than 18 hours or less than 12 hours, and most preferably is less than 10 hours, less than 8 hours or less than 6 hours. The specific time interval may be at least 5 minutes, more preferably at least 30 minutes, at least 1 hour or at least 2 hours, and most preferably is at least 3 hours, at least 4 hours or at least 5 hours. The specific time interval may be between 5 minutes and 48 hours, more preferably between 30 minutes and 24 hours, between 1 and 18 hours or between 2 and 12 hours, and most preferably is between 3 and 10 hours, between 4 and 8 hours or between 5 and 6 hours. Advantageously, a user can confirm that the temperature stays within a desired range.

The apparatus may comprise a base configured to sit on a flat surface. In a preferred embodiment, the base comprises a non-slip material. The non-slip material may be rubber. Advantageously, the rubber base prevents the apparatus from slipping and reduces the noise caused by the agitator.

The apparatus may comprise a weight. The weight may be disposed towards or substantially adjacent to a base of the housing. Advantageously, the weight will stabilise the apparatus. [How much should the agitator weigh to ensure that it is stable?]

In accordance with a second aspect, there is provided a kit for storing PRP, the kit comprising the apparatus of the first aspect and a PRP container.

The PRP container may comprise a plastic. The plastic may by polypropylene.

The PRP container may be configured to allow oxygen penetration therein. Alternatively, the container may be configured to prevent oxygen penetration. In a preferred embodiment, the PRP container is configured to allow oxygen penetration therein.

The PRP container may comprise a lid. The lid may be removable.

The kit may comprise a plurality of PRP containers. Preferably, the kit comprises at least one PRP container for each recess. Advantageously, each PRP container may be configured to comprise a suitable amount of PRP for one treatment. A suitable amount of PRP may be between 0.01 ml and 10 ml, more preferably between 0.5 ml and 5 ml or between 0.1 ml and 2.5 ml, and most preferably between 0.2 ml and 1 ml or between 0.4 ml and 0.6 ml.

The kit may comprise a container comprising an activator configured to activate the PRP. The activator may comprise collagen.

The kit may comprise a plurality of activator containers comprising the activator. The kit may comprise the same number of PRP containers and activator containers. Each activator container may comprise a suitable amount of activator for one treatment. A suitable amount of activator may be between 0.01 ml and 25 ml, more preferably between 0.5 ml and 10 ml or between 0.1 ml and 5 ml, and most preferably between 0.25 ml and 3 ml or between 0.5 ml and 2 ml. Advantageously, a user could combine the contents of one PRP container with one activator container immediately prior to use without the need to measure out specific amounts.

In accordance with a third aspect, there is provided a method of storing PRP, the method comprising:
 disposing the PRP in a PRP container; and
 agitating the PRP in a circular motion at a frequency of between 10 and 10,000 revolutions per minute (RPM).

Agitating the PRP may comprise moving the PRP container in a circular motion. The PRP container may be moved in a circular motion at a frequency of between 50 and 1,000 RPM, more preferably between 100 and 750 RPM or between 150 and 500 RPM and most between 200 and 400 RPM or between 250 and 450 RPM.

Alternatively, or additionally, agitating the PRP may comprise moving the PRP container in a linear motion.

The method may comprise maintaining the PRP at a temperature of at least 15° C., at least 16° C., at least 17° C. or at least 18° C., and most preferably at a temperature of at least 19° C. or at least 20° C. The method may comprise maintaining the PRP at a temperature of less than 30° C., less than 29° C. or less than 28° C., and more preferably at a temperature of less than 27° C. or less than 26° C., and most preferably at a temperature of less than 25° C. or less than 24° C.

The method may comprise maintaining the PRP at a temperature between 15° C. and 29° C., more preferably at a temperature between 16° C. and 28° C., between 17° C.

and 27° C. or between 18° C. and 26° C., and most preferably between 19° C. and 25° C. or between 20° C. and 24° C.

The PRP may be agitated and maintained at the desired temperature simultaneously.

The PRP may be agitated and maintained at the desired temperature for at least 12 hours, more preferably at least 1 day, at least 2 days, at least 3 day or at least 4 days, and most preferably at least 5 days, at least 6 days, at least 7 days or at least 8 days.

The PRP container may be as defined in relation to the second aspect.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:—

Example 1-Storage Device

Figure 1:
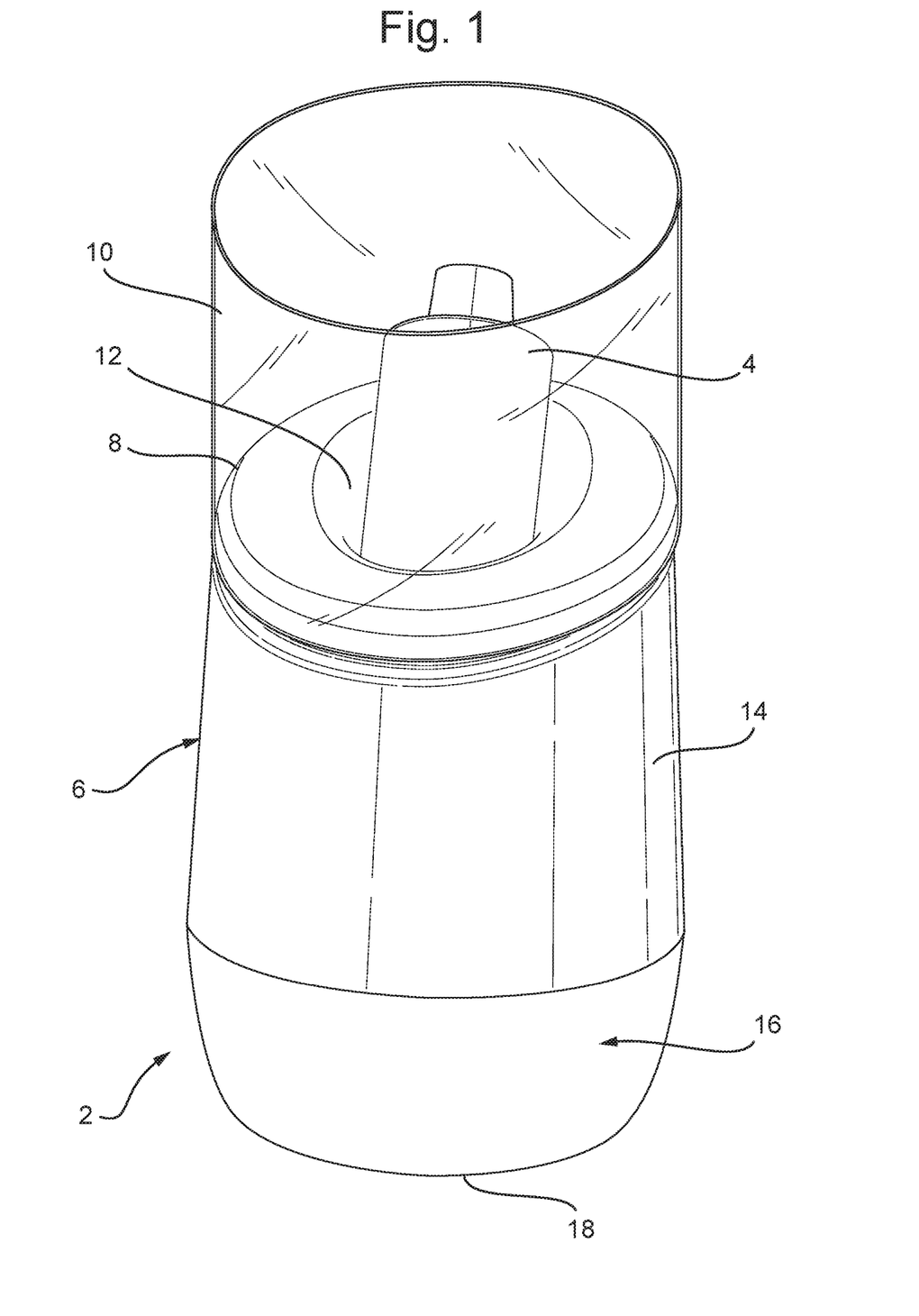
FIG. 1 is a perspective view of an apparatus configured to store a container of platelet-rich plasma (PRP)

An apparatus 2 configured to store a container 4 comprising PRP is shown in FIGS. 1 to 6. As shown in FIG. 1, the apparatus 2 comprises a housing 6, a platform 8 and a cover 10. The platform 8 is disposed above and adjacent to the housing 6 and, as discussed in more detail below, defines a recess 12 sized to receive the container 4 therein. The cover 10 is configured to reversibly fit over the platform 8.

The housing 6 comprises two parts, an upper housing member 14 and a lower housing member 16 which slot together to define the housing 6. The lower housing member 16 comprises a substantially flat base 18 to allow the apparatus 2 to rest on a flat surface. The base 18 comprises a rubber pad 20 disposed on an external side of the base 18 to prevent the apparatus from slipping.

Figure 2:
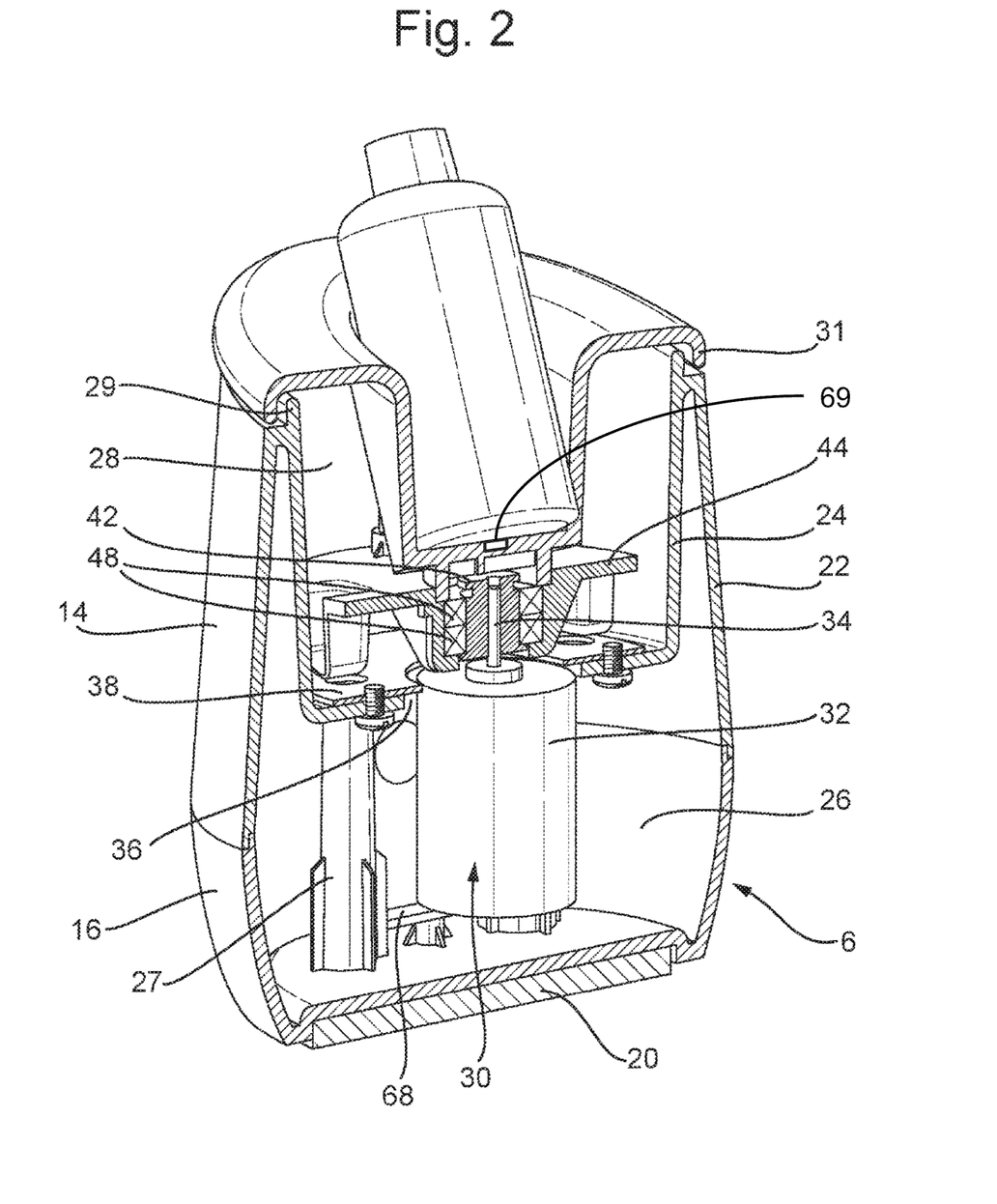
FIG. 2 is a cross-section of the apparatus.

As can be seen in FIG. 2, the upper housing member 14 comprises an external wall 22 and an internal wall 24. The lower housing member 16 and the external and internal walls 22, 24 of the upper housing member 14 define a lower chamber 26. Similarly, the platform 8 and the internal wall 24 of the upper housing member 14 define an upper chamber 28. The lower housing member 16 comprises connecting members 27 which extend between the base 18 of the lower housing member 16 and to the internal wall 24 of the upper housing member 14. The connecting members 27 are fastened to the internal wall 24 using screws 25.

The upper housing member 16 defines a projection 29 which defines a wall extending around a top surface of the upper housing member 16. The edge of the platform 8 defines a lip 31 which is sized to extend around the outside of the projection 29. The combination of the projection 29 and lip 31 prevent dirt and dust from getting into the apparatus 2.

The apparatus 2 comprises an agitator which comprises a motor 30 comprising a stator 32 and rotor 34. The stator 32 is the stationary component of the motor 30 and is substantially disposed in the lower chamber 26. The rotor 34 is the rotating component of the motor 30 and extends from the stator 32, through an aperture 36 in internal wall 24 and into the upper chamber 28. The motor further comprises a motor plate 38, which is coupled to the stator 32. The inventors have found that it is advantageous to dispose a dampening layer (not shown) between the stator 32 and the motor plate 38 to dampen vibrations. For instance, in some embodiments, the inventors have used a neoprene pad as a dampening layer. This dampens vibration and allows flexibility and resistance to agitation motion. The motor plate 38 is disposed in the upper chamber 28 and extends across the aperture 36. The motor plate 38 is fixed to the internal wall 24 by screws 40, thereby coupling the stator 32 to the upper housing member 14. A cam 42 is mounted on the rotor 34 and is disposed in the upper chamber 28. The cam 42 defines a cylindrical shape, and the rotor 34 is mounted in a position 1.25 mm away from the centre of the cam 42.

Figure 3:
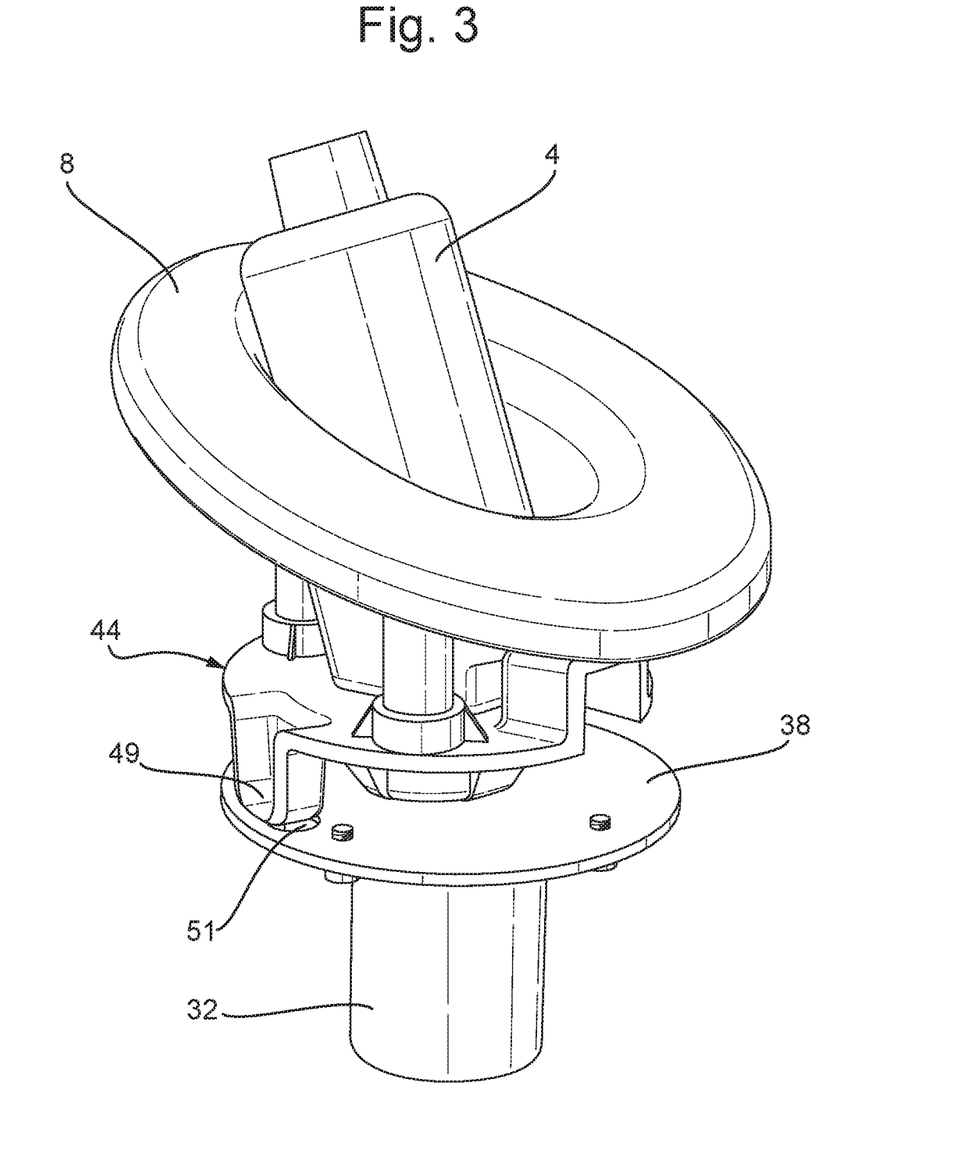
FIG. 3 is a perspective view of components of the apparatus.

As shown in FIGS. 2 and 3, a bottom cradle 44 is disposed in the upper chamber 28 and is fixed to the platform 8 by screws 46. The inventors have found that disposing a padding material (not shown) between the platform 8 and the bottom cradle 44 reduces noise produced by the apparatus 2. For instance, the padding may comprise cotton wool.

Figure 4:
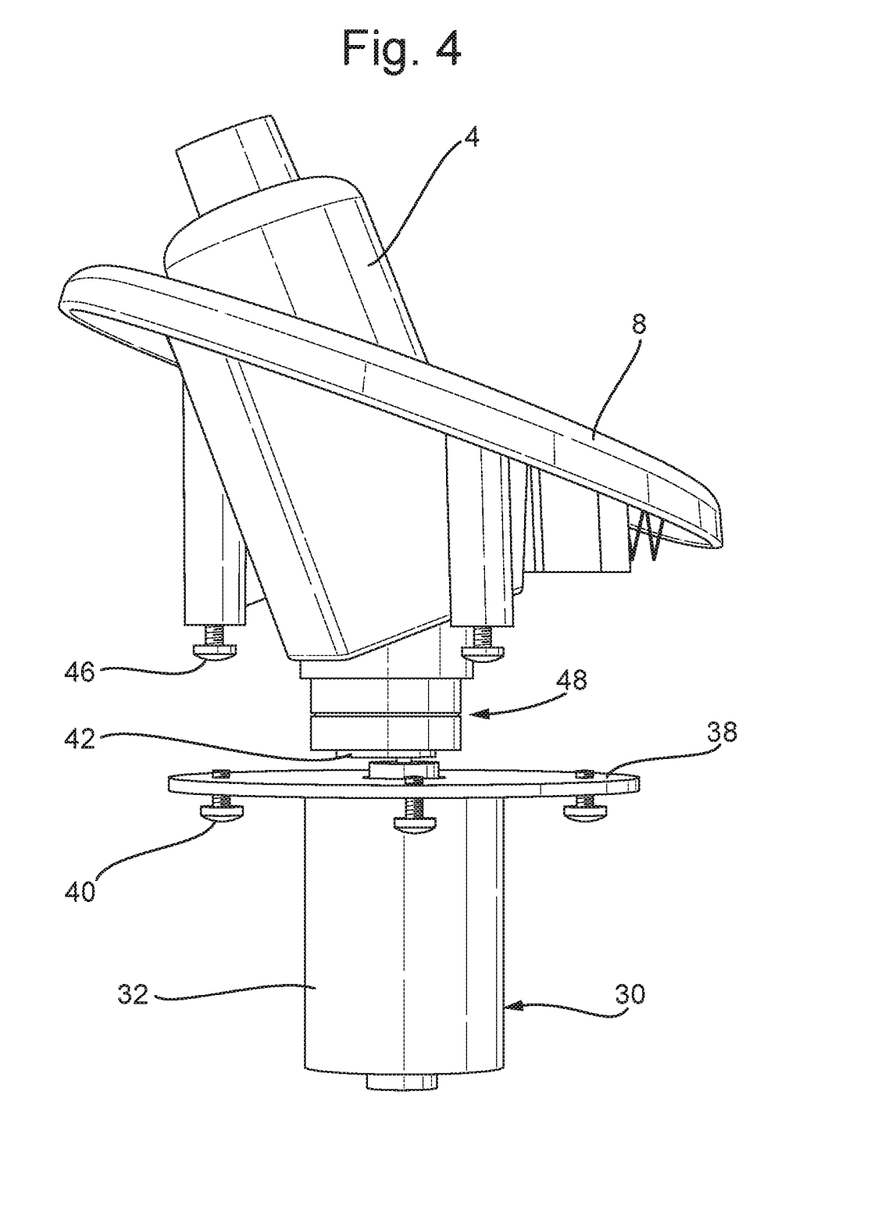
FIG. 4 is a side view of further components of the apparatus.

Bearings 48 disposed between the bottom cradle 44 and the cam 42 couple the parts together while minimising friction due to the rotation of the cam 42. FIG. 4 shows how the platform 8 is positioned relative to the motor 30, with the housing 6 and bottom cradle 44 removed for clarity.

As shown in FIG. 3, the bottom cradle 44 comprises two projections 49. The projections 49 are disposed on opposing sides of the bottom cradle 44 and extend from a bottom surface of the bottom cradle 44 into corresponding circular apertures 51 in the motor plate 38. The apertures 51 are large enough to allow the bottom cradle 44 to move in a circular motion as the cam 42 rotates, but prevent rotation of the bottom cradle 44.

Figure 5:
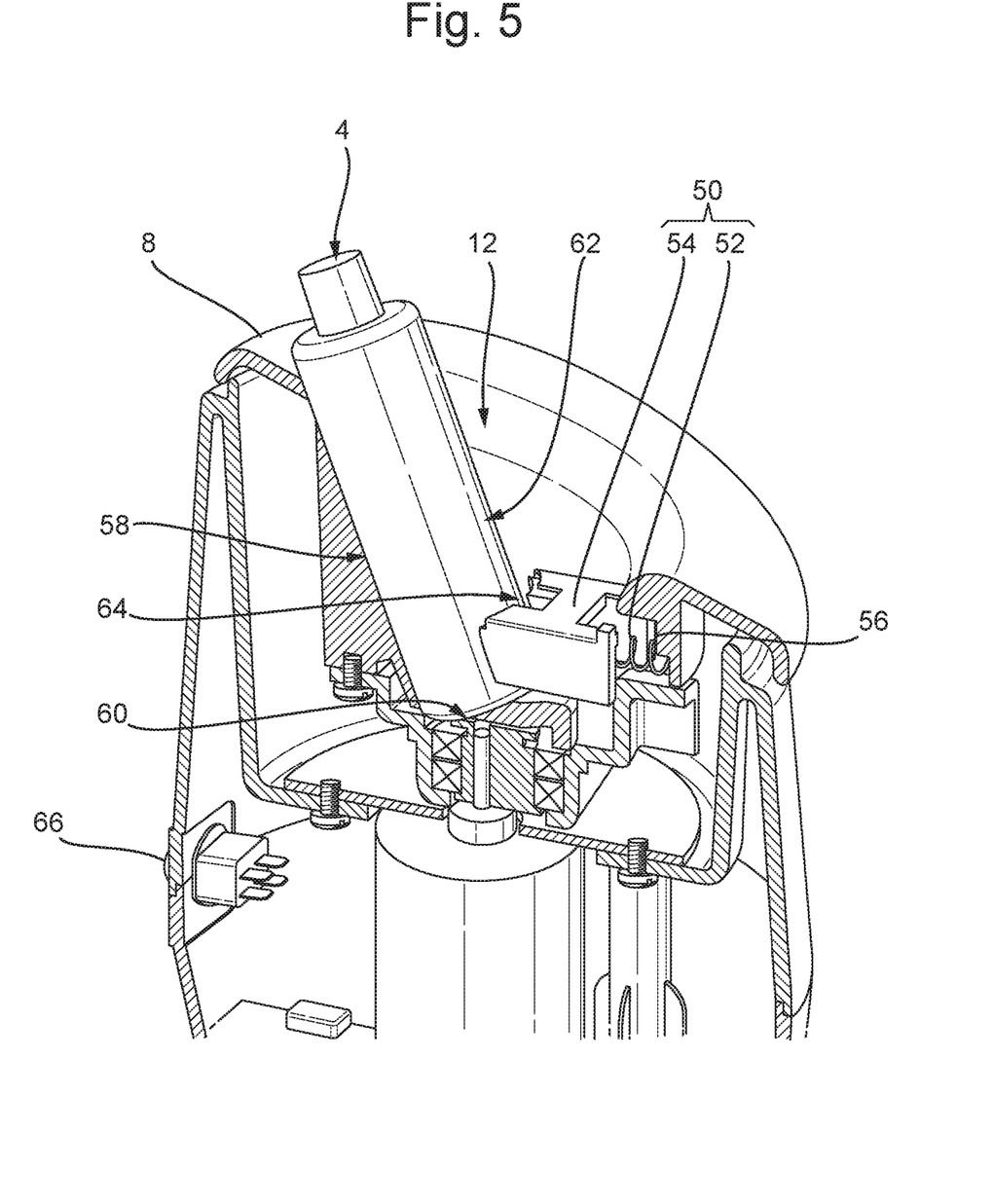
FIG. 5 is a further cross-section of the apparatus.
Figure 6:
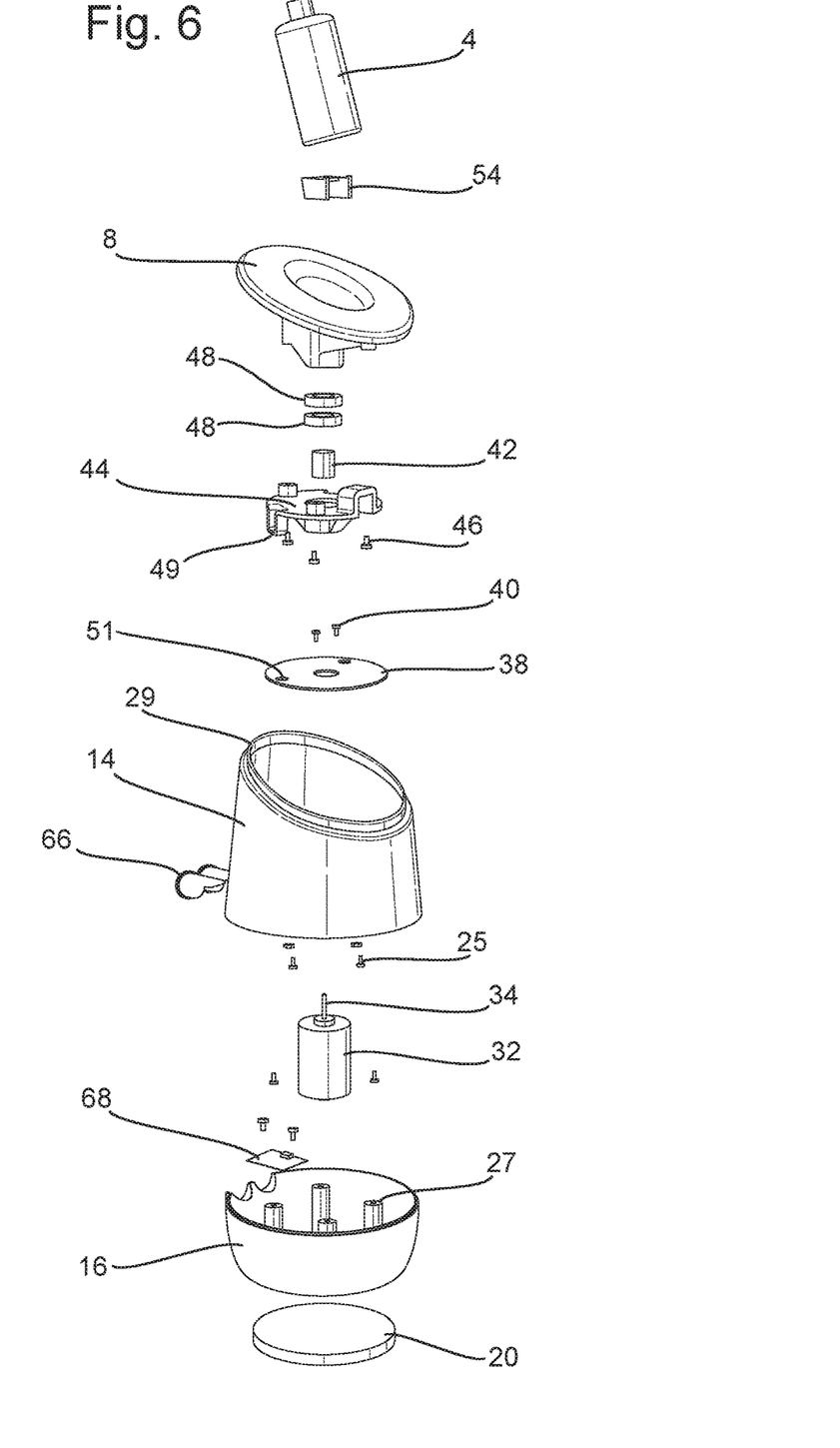
FIG. 6 is an exploded diagram of the apparatus.

As mentioned above, the platform 8 defines a recess 12 sized to receive the container 4 therein. As shown in FIG. 5, the platform 8 comprises a retainer 50 comprising a spring 52 and contacting member 54. The spring 52 is provided parallel to the horizontal and is configured to bias the contacting member 54 away from a front side 56 of the recess 12. Accordingly, when a container 4 is disposed in the recess 12 the spring 52 causes the contacting member 54 to bias the container 4 against a rear side 58 of the recess 12. This holds the container 4 in place until a user exhibits a sufficient force on the container 4 to remove it.

The rear side 58 of the recess 12 defines an angle of 20.7° to the vertical. Accordingly, placing the container 4 against the rear side 58 of the recess causes the base 60 of the container 4 to define an angle of 20.7° to the horizontal. As the container 4 is inserted into the recess 12 at this angle, the base 60 will push the contacting member 54 towards the front side 56 of the recess 12 until the base 60 of the container 4 has passed the contacting member 54. At this point, the contacting member 54 will exert a force on a side 62 of the container 4 biasing it against the rear side 58 of the recess 12 and holding it in place, as explained above. To ensure maximum contact with the side 62 of the container 4, the contacting side 64 of the contacting member 54 will also define an angle of 20.7° to the vertical.

The apparatus 2 comprises an electrical adapter 66 and power switch allowing the apparatus to be attached to a power source. The adapter 66 is electrically connected (not shown) to a printed circuit board (PCB) 68 which is electrically connected to the motor 30. Accordingly, when the apparatus 2 is connected to a power source and switched on, the motor 30 will cause the cam 42 to rotate, thereby moving the bottom cradle 44 and platform 8 in a circular manner. The inventors have found that configuring the motor 30 to operate at a speed of 300 revolutions per minute (RPM) provides ideal agitation to reduce aggregation of PRP stored in a container 4 which is disposed in the recess 12.

Example 2-Alternative and/or Additional Features

The apparatus 2 described in Example 2 could comprise a number of additional features. In particular, the apparatus 2 could comprise a battery disposed in the lower chamber 26. The battery would be configured to power the apparatus 2 when it was not attached to a power source. This could be particularly useful for a person using PRP at home. For instance, they could take the apparatus 2 with them when they visit a clinician to receive their PRP sample. As soon as the person received a container 4 containing their PRP they could place it in the apparatus and transport it home. Since the PRP container will be placed in the apparatus 2, and agitated as soon as it is received, it will not matter if the person takes some time between receiving the sample and returning home.

The apparatus could also comprise a temperature controlling element 69. This could comprise a temperature sensor configured to sense the temperature, a heater and/or a cooler configured to maintain the temperature of the apparatus between 20 and 24° C. The temperature sensor may be disclosed towards the base of a recess 12 (as shown in FIG. 2). The inventors have found that this temperature is ideal for storing PRP.

Figure 7A:
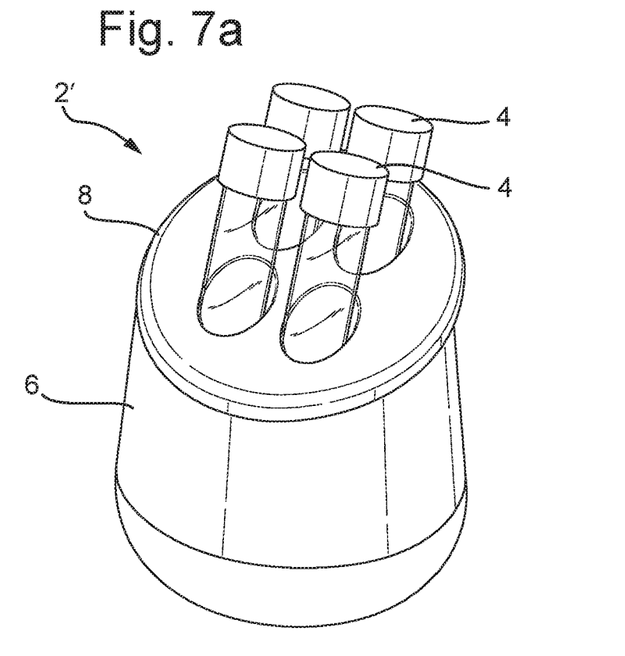
FIG. 7a is a perspective view of an apparatus configured to store four containers of PRP.
Figure 7B:
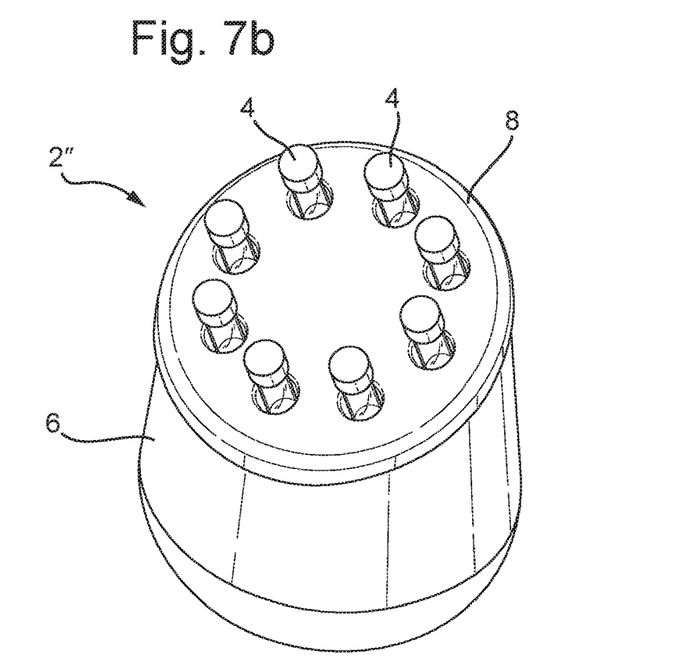
FIG. 7b is a perspective views of an apparatus configured to store eight containers of PRP.
Figure 7C:
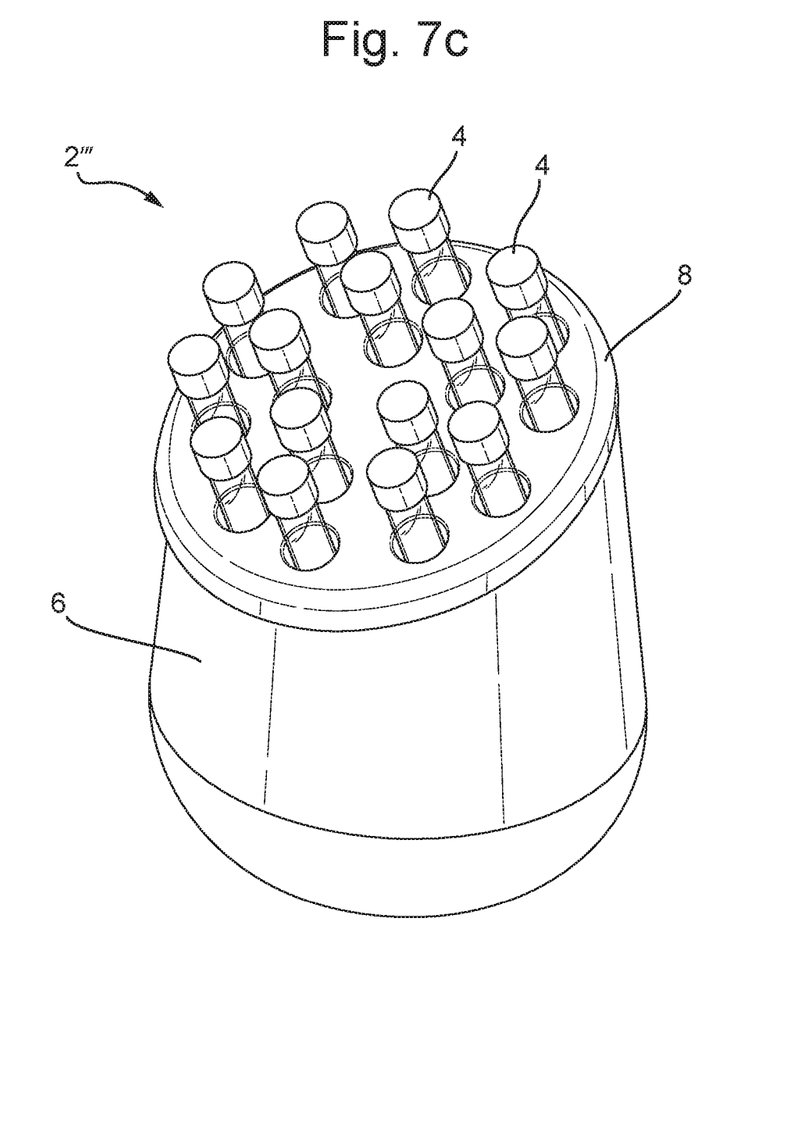
FIG. 7c is a perspective views of an apparatus configured to store fifteen containers of PRP.

Furthermore, instead of defining one recess 12, the platform 8 could be configured to define a plurality of recesses allowing the apparatus to store multiple containers 4. For instance, FIG. 7a shows an apparatus 2' configured to store four containers 4, FIG. 7b shows an apparatus 2" configured to store eight containers 4 and FIG. 7c shows an apparatus 2''' configured to store fifteen containers. This could be particularly useful for a user where they might want to apply the PRP multiple times, for instance in a cosmetic application. Each container 4 could comprise a sufficient quantity for one application, ensuring that the user received the correct amount of PRP each time it was applied.

Figure 8:
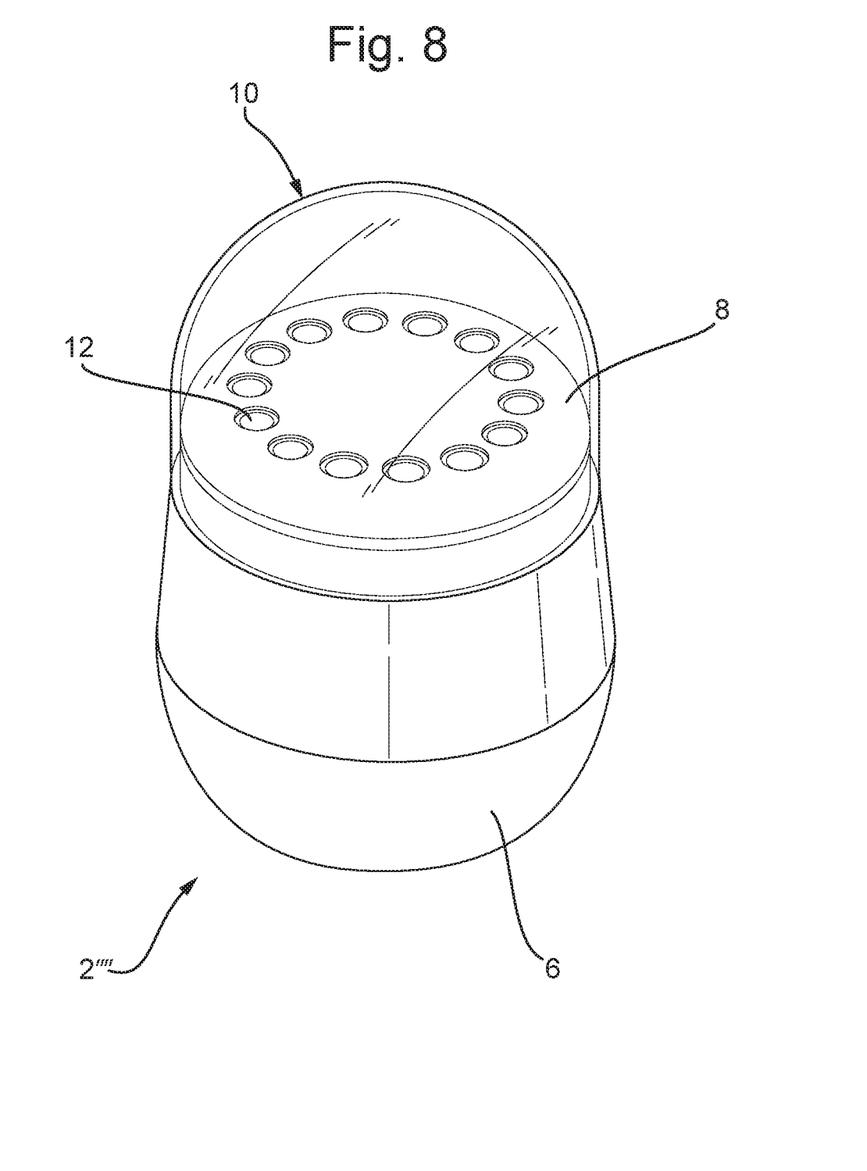
FIG. 8 is a perspective view of an apparatus configured to store fourteen containers of PRP.

A further apparatus 2'''' is shown in FIG. 8. In this apparatus, the topcradleplatform 8 defines fourteen recesses 12, allowing the apparatus to store fourteen containers 4. Accordingly, this could provide enough separate contains of PRP to allow a user to apply activated PRP to their skin twice a day for a week. In this embodiment, the cover 10 is configured to reversibly fit over the platform 8 and a top portion of the housing 6.

The invention claimed is:

1. An apparatus for storing platelet-rich plasma (PRP), the apparatus being configured to removably receive a platelet-rich plasma (PRP) container and comprising:
a housing;
a single platform defining a plurality of recesses, each recess being configured to receive exactly one PRP container therein;
a plurality of retainers, such that the apparatus comprises a retainer for each recess and each retainer is configured to retain exactly one PRP container in a corresponding recess;
an agitator, disposed inside the housing and below the single platform, wherein the agitator is coupled to the single platform and configured to move the single platform, and thereby agitate PRP stored in any retained PRP container, wherein the agitator is configured to move the single platform in a circular motion at a frequency of between 10 and 10,000 revolutions per minute (RPM);
a temperature controller, wherein the temperature controller comprises a temperature sensor and is configured to maintain the PRP stored in any retained PRP container at a temperature between 15° C. and 30° C.; and
a cover configured to be removably disposed directly over the single platform and any PRP containers disposed thereon.

2. The apparatus according to claim 1, wherein the each retainer comprises a biasing means configured to bias a retained PRP container against a first side of the corresponding recess.

3. The apparatus according to claim 2, wherein the biasing means comprises a spring, wherein a proximal end of the spring is fixedly attached to a second side of the corresponding recess and the spring is configured to bias the retained PRP container against the first side of the corresponding recess, wherein the second side is opposite to the first side.

4. The apparatus according to claim 1, wherein the agitator is further configured to move the single platform in a circular motion at a frequency of between 50 and 1,000 RPM, between 100 and 750 RPM, between 150 and 500 RPM, between 200 and 400 RPM or between 250 and 450 RPM.

5. The apparatus according to claim 1, wherein the agitator is further configured to move any retained PRP container in a linear motion.

6. The apparatus according to claim 1, wherein the agitator is configured to agitate the PRP stored in any retained PRP container continually.

7. The apparatus according to claim 1, wherein the agitator is configured to agitate the PRP stored in any retained PRP container intermittently.

8. The apparatus according to claim 1, wherein the temperature controller is further configured to maintain the PRP stored in any retained PRP container at a temperature between 16° C. and 28° C.

9. The apparatus according to claim 1, further comprising a PRP container configured to be retained in one of the plurality of recesses.

10. The apparatus according to claim 1, further comprising a rubber base configured to sit on a flat surface.

11. The apparatus according to claim 1, wherein the housing is shaped to removably receive a portion of the cover.

12. A kit for storing PRP, the kit comprising:
an apparatus for storing platelet-rich plasma (PRP), the apparatus being configured to removably receive a platelet-rich plasma (PRP) container and comprising:
(1) a housing, (2) a single platform defining a plurality of recesses, each recess being configured to receive exactly one PRP container therein, (3) a plurality of retainers such that the apparatus comprises a retainer for each recess and each retainer is configured to retain exactly one PRP container in a corresponding recess, (4) an agitator disposed inside the housing and below the single platform, wherein the agitator is coupled to the single platform and configured to move the single platform and thereby agitate PRP stored in any retained PRP container, wherein the agitator is configured to agitate the single platform in a circular motion at a frequency of between 10 and 10,000 revolutions per minute (RPM), (5) a temperature controller, wherein the temperature controller comprises a temperature sensor and is configured to maintain the PRP stored in any retained PRP container at a temperature between 15° C. and 30° C., and (6) a cover configured to be removably disposed directly over the single platform and any PRP containers disposed thereon; and the PRP container.

13. A method of storing PRP, the method comprising:
disposing the PRP in a PRP container;
disposing the PRP container in a recess of an apparatus for storing platelet-rich plasma (PRP), the apparatus being configured to removably receive a platelet-rich plasma (PRP) container and comprising: (1) a housing, (2) a single platform defining a plurality of recesses, each recess being configured to receive exactly one PRP container therein, (3) plurality of retainers such that the apparatus comprises a retainer for each recess and each retainer is configured to retain exactly one PRP container in a corresponding recess, (4) an agitator disposed inside the housing and below the single platform, wherein the agitator is coupled to the single platform and configured to move the single platform and thereby agitate PRP stored in any retained PRP container, wherein the agitator is configured to agitate the single platform in a circular motion at a frequency of between 10 and 10,000 revolutions per minute (RPM), and (5) a temperature controller, wherein the temperature controller comprises a temperature sensor, (6) a cover configured to be removably disposed directly over the single platform and any PRP containers disposed thereon;
using the agitator to agitate the PRP at a frequency of between 10 and 10,000 revolutions per minute (RPM); and
using the temperature controller to maintain the PRP at a temperature of between 15° C. and 30° C.

* * * * *